US012466323B2

(12) United States Patent
Wang et al.

(10) Patent No.: US 12,466,323 B2
(45) Date of Patent: Nov. 11, 2025

(54) METHOD AND APPARATUS FOR DETERMINING TRAILER ANGLE

(71) Applicant: STONERIDGE ELECTRONICS AB, Solna (SE)

(72) Inventors: Po-Jen Wang, Daly City, CA (US); Rahul Mangharam, Philadelphia, PA (US); Bradley J. Corrodi, Princeton, NJ (US); John Couperthwaite, Ypsilanti, MI (US); Tom Agnello, Northville, MI (US); Dominik Marx, Novi, MI (US)

(73) Assignee: STONERIDGE ELECTRONICS AB, Solna (SE)

( * ) Notice: Subject to any disclaimer, the term of this patent is extended or adjusted under 35 U.S.C. 154(b) by 157 days.

(21) Appl. No.: 18/409,876

(22) Filed: Jan. 11, 2024

(65) Prior Publication Data
US 2025/0229716 A1 Jul. 17, 2025

(51) Int. Cl.
*B60R 1/27* (2022.01)
*B60R 1/24* (2022.01)

(52) U.S. Cl.
CPC ............ *B60R 1/27* (2022.01); *B60R 1/24* (2022.01); *B60R 2300/607* (2013.01)

(58) Field of Classification Search
None
See application file for complete search history.

(56) References Cited

U.S. PATENT DOCUMENTS

| 9,971,943 | B2 | 5/2018 | Greenwood et al. |
| 10,000,155 | B2 | 6/2018 | Schrepfer |
| 11,780,371 | B2 | 10/2023 | Sharma et al. |
| 2010/0171828 | A1* | 7/2010 | Ishii ............... H04N 7/183 348/135 |

(Continued)

FOREIGN PATENT DOCUMENTS

| DE | 102010032411 | 2/2012 |
| WO | 2021019060 | 2/2021 |
| WO | 2022256255 | 12/2022 |

*Primary Examiner* — Rebecca A Volentine
(74) *Attorney, Agent, or Firm* — Carlson, Gaskey & Olds, P.C.

(57) ABSTRACT

A method of determining a trailer angle includes obtaining a birds-eye view image of a commercial vehicle based on image data from at least one camera mounted to the commercial vehicle that depicts at least one side of the trailer. The commercial vehicle includes a tractor and a trailer. The method also includes determining which of a plurality of lines in the birds-eye view image intersect a predefined pivot region which includes and surrounds a pivot point between the trailer and the tractor, determining a trailer angle of the trailer with respect to the tractor based on at least a first portion of the plurality of lines that intersect the predefined pivot region, and panning a video feed of images from the at least one camera based on the trailer angle. The determining the trailer angle includes excluding a second portion of the plurality of lines that do not intersect the predefined pivot region from the determination of the trailer angle, or weighting the first portion of the plurality of lines greater than the second portion of the plurality of lines in the determination of the trailer angle. A system for a commercial vehicle is also disclosed.

20 Claims, 8 Drawing Sheets

(56) References Cited

U.S. PATENT DOCUMENTS

| | | |
|---|---|---|
| 2014/0330487 A1 | 11/2014 | Brandt et al. |
| 2016/0049020 A1* | 2/2016 | Kuehnle .............. G07C 5/0841 701/34.4 |
| 2017/0374287 A1 | 12/2017 | Lang |
| 2019/0184900 A1 | 6/2019 | Lang et al. |
| 2020/0285913 A1 | 9/2020 | Gavrilovic et al. |
| 2021/0053490 A1 | 2/2021 | Smits |
| 2022/0292841 A1 | 9/2022 | Corrodi et al. |
| 2022/0314881 A1 | 10/2022 | Gudarzi et al. |
| 2022/0396209 A1* | 12/2022 | Sharma ................ G06V 10/803 |
| 2022/0396322 A1 | 12/2022 | Gudarzi et al. |

* cited by examiner

METHOD AND APPARATUS FOR DETERMINING TRAILER ANGLE

TECHNICAL FIELD

This disclosure relates to a method and apparatus for determining a trailer angle between a trailer and a tractor.

BACKGROUND

Vehicle camera systems for mirror replacement or for supplementing mirror views are utilized in commercial vehicles to enhance the ability of a vehicle operator to see a surrounding environment. Camera monitor systems (CMS) utilize one or more cameras to provide an enhanced field of view to a vehicle operator. In some examples, the mirror replacement systems cover a larger field of view than a conventional mirror, or include views that are not fully obtainable via a conventional mirror.

In a commercial vehicle setting, as an articulated commercial vehicle which includes a tractor and trailer turns a corner, the center line of the trailer diverges at a successively greater angle relative to the center line of the tractor. Thus, on the side of the vehicle corresponding to the direction of the turn, it is desirable for the driver to have a field of view that is at a greater "outward" angle relative to the center line of the tractor, in order to keep the rearmost wheels of the trailer visible in the display. This functionality in a CMS display has been described as "auto-panning"—the digital camera system simulates the axial rotation (a panning motion) of a traditional camera to shift the displayed view side-to-side. However, detecting an angle of the trailer with respect to the tractor for such image panning presents technical challenges, as the physical environment is not well suited to a mechanical or limit-switch sensor.

When a vehicle is traveling in a forward direction, a geometric "kinematic" model can be used to estimate trailer angle based on the relevant dimensions of the vehicle combination (wheelbase, speed, steering angle) if they are known. However, when the vehicle is reversing, kinematics become unreliable as errors in such algorithms accumulate over time (e.g., a combination with the tractor traveling straight backward can result in a full range of trailer angles over time, based on very small differences in the initial trailer angle).

SUMMARY

A method of determining a trailer angle according to an example embodiment of the present disclosure includes obtaining a birds-eye view image of a commercial vehicle based on image data from at least one camera mounted to the commercial vehicle that depicts at least one side of the trailer. The commercial vehicle includes a tractor and a trailer. The method includes determining which of a plurality of lines in the birds-eye view image intersect a predefined pivot region which includes and surrounds a pivot point between the trailer and the tractor, determining a trailer angle of the trailer with respect to the tractor based on at least a first portion of the plurality of lines that intersect the predefined pivot region, and panning a video feed of images from the at least one camera based on the trailer angle. The determining of the trailer angle includes excluding a second portion of the plurality of lines that do not intersect the predefined pivot region from the determination of the trailer angle, or weighting the first portion of the plurality of lines greater than the second portion of the plurality of lines in the determination of the trailer angle.

In a further embodiment of the foregoing embodiment, the determining of the trailer angle includes performing the excluding of the second portion of the plurality of lines that do not intersect the predefined pivot region from the determination of the trailer angle.

In a further embodiment of any of the foregoing embodiments, the determining of the trailer angle includes performing the weighting the first portion of the plurality of lines greater than the second portion of the plurality of lines in the determination of the trailer angle.

In a further embodiment of any of the foregoing embodiments, the at least one camera includes a first camera and a second camera on opposing sides of the commercial vehicle that are both rearward-facing cameras, and the obtaining of the birds-eye view image of the commercial vehicle based on the image data from the least one camera includes obtaining an image set that includes a respective image from each of the first camera and second camera and utilizing inverse perspective mapping to convert image data from the respective images of the image set into the birds-eye view image.

In a further embodiment of any of the foregoing embodiments, the method includes adjusting a first image in the image set from the first camera to account for distortion of the first camera and adjusting a second image in the image set from the second camera to account for distortion of the second camera, and the birds-eye view image is obtained from the adjusted first image and the adjusted second image.

In a further embodiment of any of the foregoing embodiments, the determining of the trailer angle of the trailer includes determining a plurality of angles between a centerline of the tractor and each of said at least the first portion of the plurality of lines and determining the trailer angle based on the plurality of angles.

In a further embodiment of any of the foregoing embodiments, the pivot region is within a perimeter of the trailer in the birds-eye view image.

In a further embodiment of any of the foregoing embodiments, the pivot region has an area that is less than 20% of an area of the trailer in the birds-eye view image.

In a further embodiment of any of the foregoing embodiments, the method also includes repeating the obtaining step and determining steps for a plurality of the image sets, to determine a sequence of a plurality of trailer angles; determining a confidence score for each of the plurality of trailer angles; and adjusting a frequency at which the utilizing step, obtaining step, and determining steps are performed based on the confidence score.

In a further embodiment of any of the foregoing embodiments, the method also includes repeating the obtaining step and determining steps for a plurality of image sets, to determine a plurality of trailer angles; determining an aggregate trailer angle based on the plurality of trailer angles; and performing the panning based on the aggregate trailer angle.

A system for a commercial vehicle according to an example embodiment of the present disclosure includes at least one camera mounted to a commercial vehicle. The commercial vehicle includes a tractor and a trailer and processing circuitry operatively connected to memory. The processing circuitry is configured to obtain a birds-eye view image of the commercial vehicle based on image data from the at least one camera; determine which of a plurality of lines in the birds-eye view image intersect a predefined pivot region which includes and surrounds a pivot point between the trailer and the tractor; determine a trailer angle of the trailer with respect to the tractor based on at least a first portion of the plurality of lines that intersect the predefined pivot region; and pan a video feed of images from the at least one camera based on the trailer angle. To determine the trailer angle, the processing circuitry is configured to exclude a second portion of the plurality of lines that do not intersect the predefined pivot region from the determination of the trailer angle, or weight the first portion of the plurality of lines greater than the second portion of the plurality of lines in the determination of the trailer angle.

In a further embodiment of the foregoing embodiment, to determine the trailer angle, the processing circuitry is configured to exclude the second portion of the plurality of lines that do not intersect the predefined pivot region from the determination of the trailer angle.

In a further embodiment of any of the foregoing embodiments, to determine the trailer angle, the processing circuitry is configured to weight of the first portion of the plurality of lines greater than the second portion of the plurality of lines in the determination of the trailer angle.

In a further embodiment of any of the foregoing embodiments, the at least one camera includes a first camera and a second camera on opposing sides of the commercial vehicle that are both rearward-facing cameras. To obtain the birds-eye view image of the commercial vehicle based on image data from the least one camera, the processing circuitry is configured to obtain an image set that includes a respective image from each of the first camera and second camera, and utilize inverse perspective mapping to convert image data from the respective images of the image set into a birds-eye view image.

In a further embodiment of any of the foregoing embodiments, the processing circuitry is configured to adjust a first image in the image set from the first camera to account for distortion of the first camera and adjust a second image in the image set from the second camera to account for distortion of the second camera. The birds-eye view image is obtained from the adjusted first image and adjusted second image.

In a further embodiment of any of the foregoing embodiments, to determine the trailer angle of the trailer with respect to the tractor based on at least a first portion of the plurality of lines that intersect the predefined pivot region, the processing circuitry is configured to determine a plurality of angles between a centerline of the tractor and each of said at least the first portion of the plurality of lines, and determine the trailer angle based on the plurality of angles.

In a further embodiment of any of the foregoing embodiments, the pivot region is within a perimeter of the trailer in the birds-eye view image.

In a further embodiment of any of the foregoing embodiments, the pivot region has an area that is less than 20% of an area of the trailer in the birds-eye view image.

In a further embodiment of any of the foregoing embodiments, the processing circuitry is configured to determine a plurality of the trailer angles, determine a confidence score for each of the plurality of trailer angles, and adjust a frequency at which the trailer angles are determined based on the confidence score.

In a further embodiment of any of the foregoing embodiments, the processing circuitry is configured to determine a plurality of the trailer angles, determine an aggregate trailer angle based on the plurality of trailer angles, and perform the panning based on the aggregate trailer angle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The disclosure can be further understood by reference to the following detailed description when considered in connection with the accompanying drawings wherein.

DETAILED DESCRIPTION

Figure 1A:
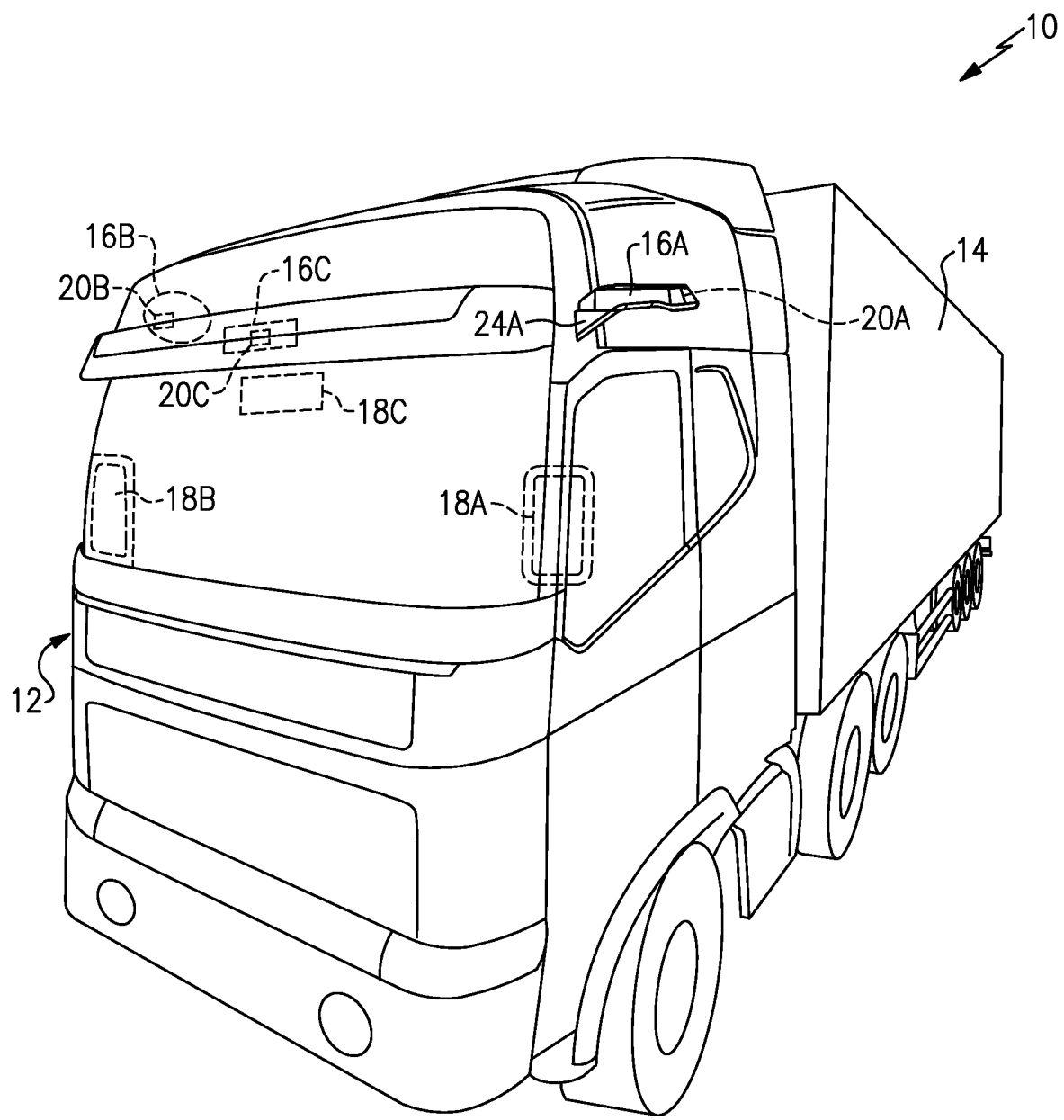
FIG. 1A is a schematic front view of a commercial truck with a camera mirror system (CMS) used to provide at least Class II and Class IV views.

Schematic views of a commercial vehicle 10 are illustrated in FIGS. 1A, 1B, 1C, and 1D. The vehicle 10 includes a vehicle cab or "tractor 12" for pulling a trailer 14, where the trailer 14 pivots with respect to the tractor 12 during turns. Although the vehicle 10 is depicted as a commercial truck with a single trailer in this disclosure, it is understood that other commercial vehicle configurations may be used (e.g., different types or quantities of trailers, articulating buses, etc.).

A pair of camera arms 16a, 16b include a respective base that is secured to, for example, the cab 12. A pivoting arm is supported by the base and may articulate relative thereto. At least one rearward facing camera 20a, 20b (generally, camera 20) is arranged respectively within the camera arms 16a, 16b. The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. The Class II view on a given side of the vehicle 10 is a subset of the class IV view of the same side of the vehicle 10. Multiple cameras also may be used in each camera arm 16a, 16b to provide these views, if desired. Class II (narrow) and Class IV (wide angle) views are defined in European R46 legislation, for example, and the United States and other countries have similar drive visibility requirements for commercial trucks. Any reference to a "Class" view is not intended to be limiting, but is intended as exemplary for the type of view provided to a display by a particular camera. Each arm 16A-16B may also provide a housing that encloses electronics, e.g., a controller, that are configured to provide various features of the CMS 15. The camera arms 16A-B may be mounted either at a roof-mount location over the cab door (as shown), or on a door-mounted bracket or station, for example.

Figure 1B:
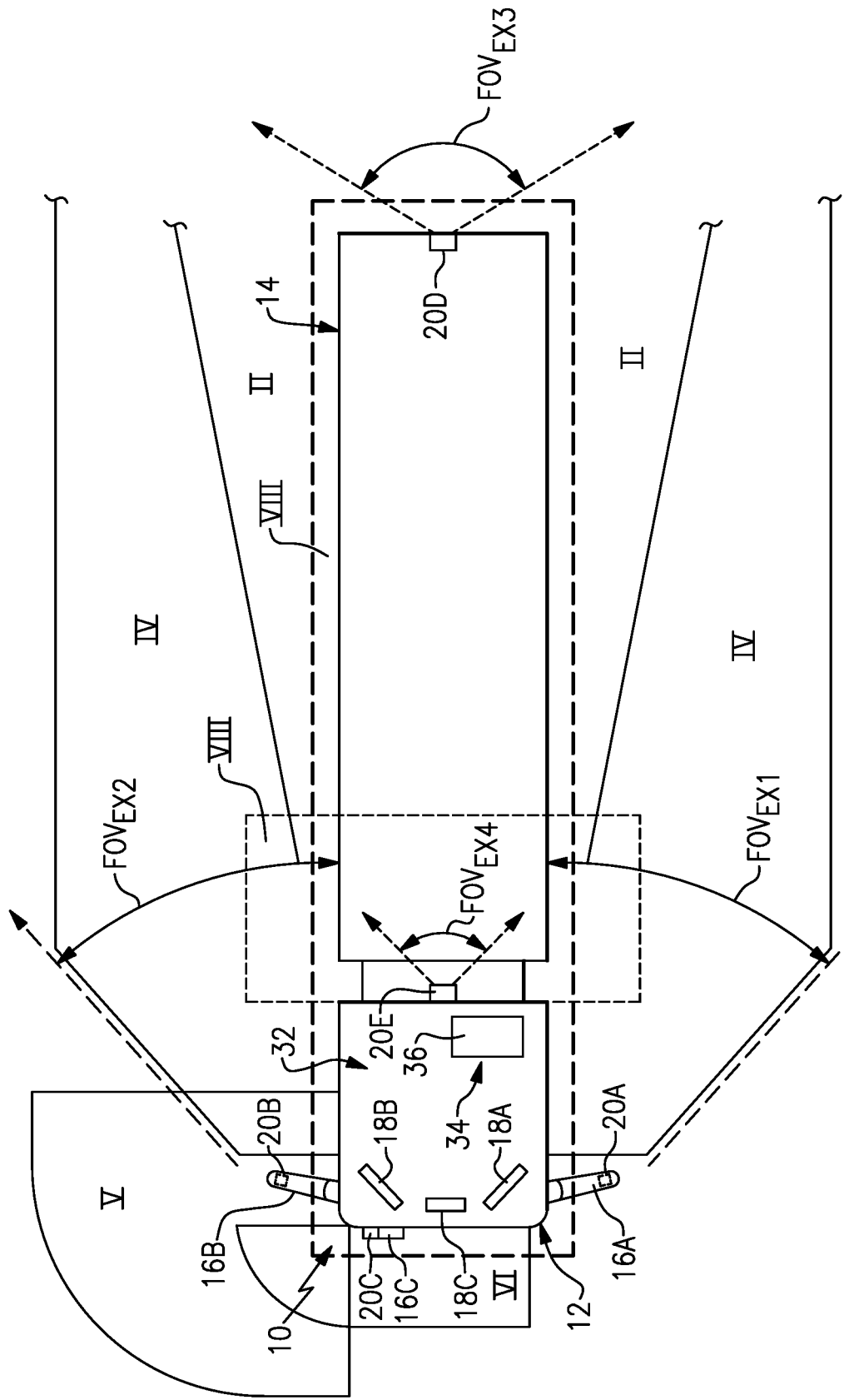
FIG. 1B is a schematic birds-eye view of the commercial truck of FIG. 1A with a CMS providing Class II, Class IV, Class V and Class VI views.

If video of Class V and Class VI views are also desired, a camera housing 16C and camera 20C may be arranged at or near the front of the vehicle 10 to provide those views (FIG. 1B).

A rear trailer camera 20D may be provided which provides a field of view $FOV_{EX3}$. The rear trailer camera 20D may be mounted at a top/centerline of the trailer, at a bumper/bed level of the trailer, or at a top-corner of the back of the trailer, for example. Alternatively, or in addition to the rear trailer camera, a "fifth wheel camera" 20E may be provided that is mounted to a rear of the tractor and that provides a field of view $FOV_{EX4}$. The fifth wheel camera 20E may be mounted anywhere between the lateral plane of the fifth wheel fixture and the top/roof edge of the tractor, for example.

Figure 1C:
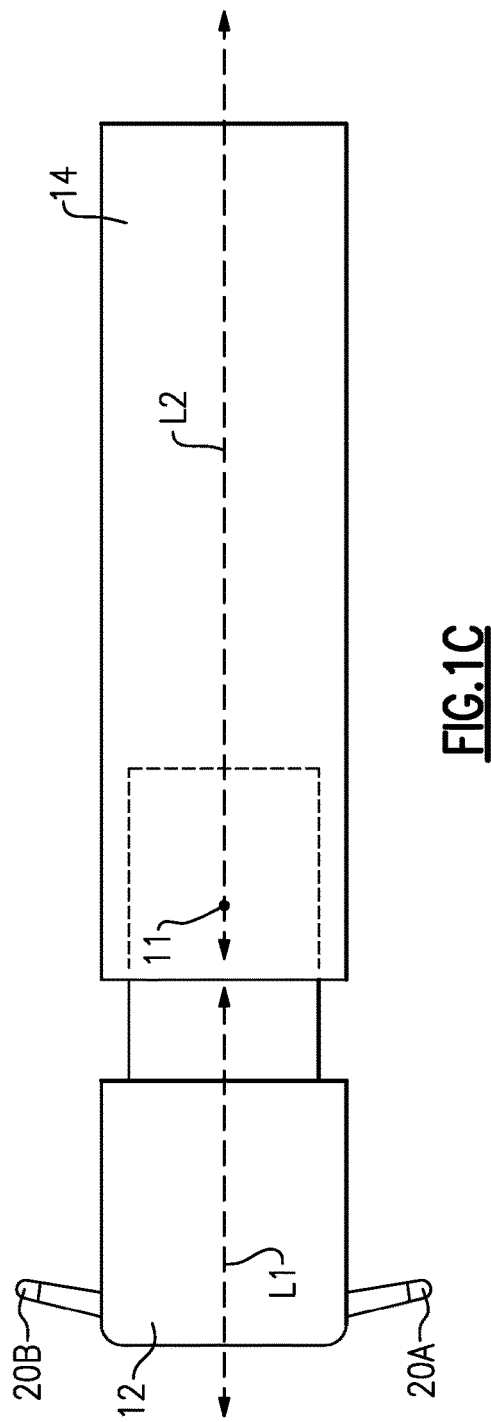
FIG. 1C is a schematic birds-eye view of the commercial truck of FIG. 1A with a trailer angle of zero.
Figure 1D:
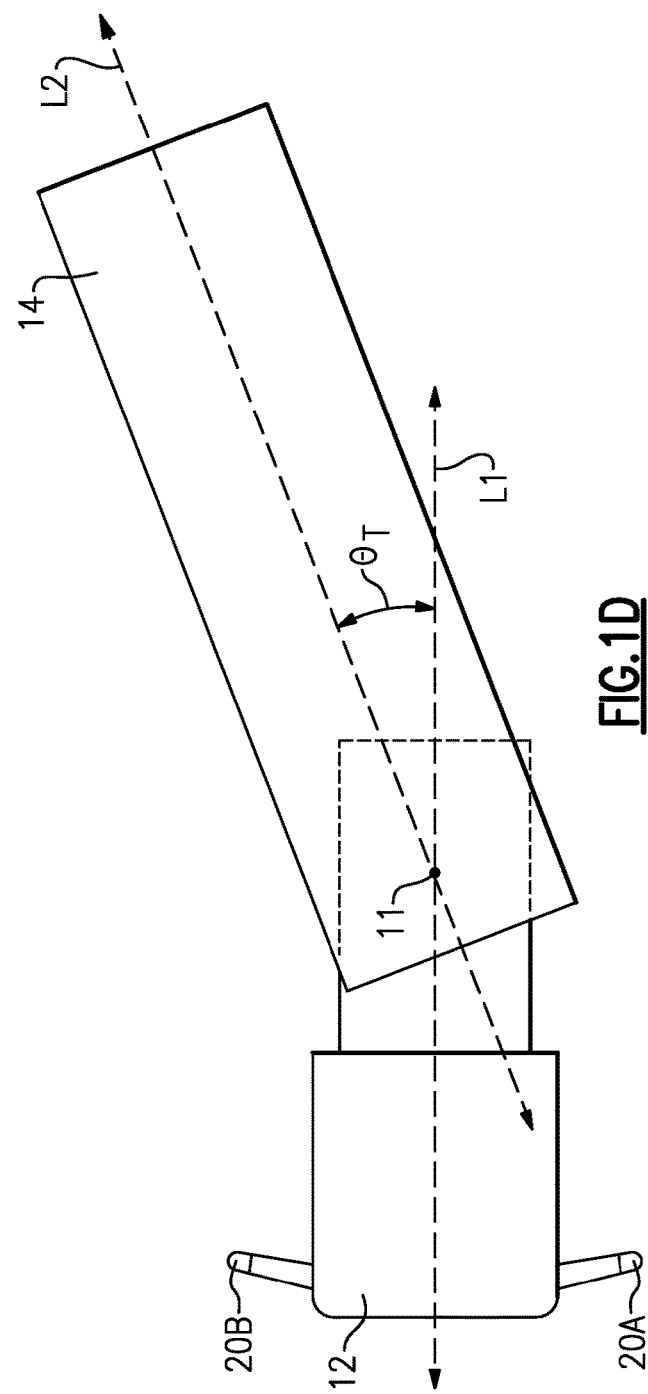
FIG. 1D is a schematic birds-eye view of the commercial truck of FIG. 1A with a non-zero trailer angle.

As shown in FIG. 1C-1D, a "kingpin" 11 is a pivot point between the tractor 12 and trailer 14, and allows the trailer 14 to pivot with respect to the tractor 12 during turns. The tractor 12 has a central longitudinal axis L1, and the trailer 14 has a central longitudinal axis L2. As shown in FIG. 1B, when the tractor 12 is not turning, the axes L1, L2 are parallel or co-axial, and there is no angle between the axis L1, L2. As shown in FIG. 1C, when the tractor 12 is turning, an angle $\theta_T$ is formed between the axes L1, L2. The angle between the axes L1, L2, which is approximately 20° in FIG. 1C, will be referred to a "trailer angle" herein.

Figure 2:
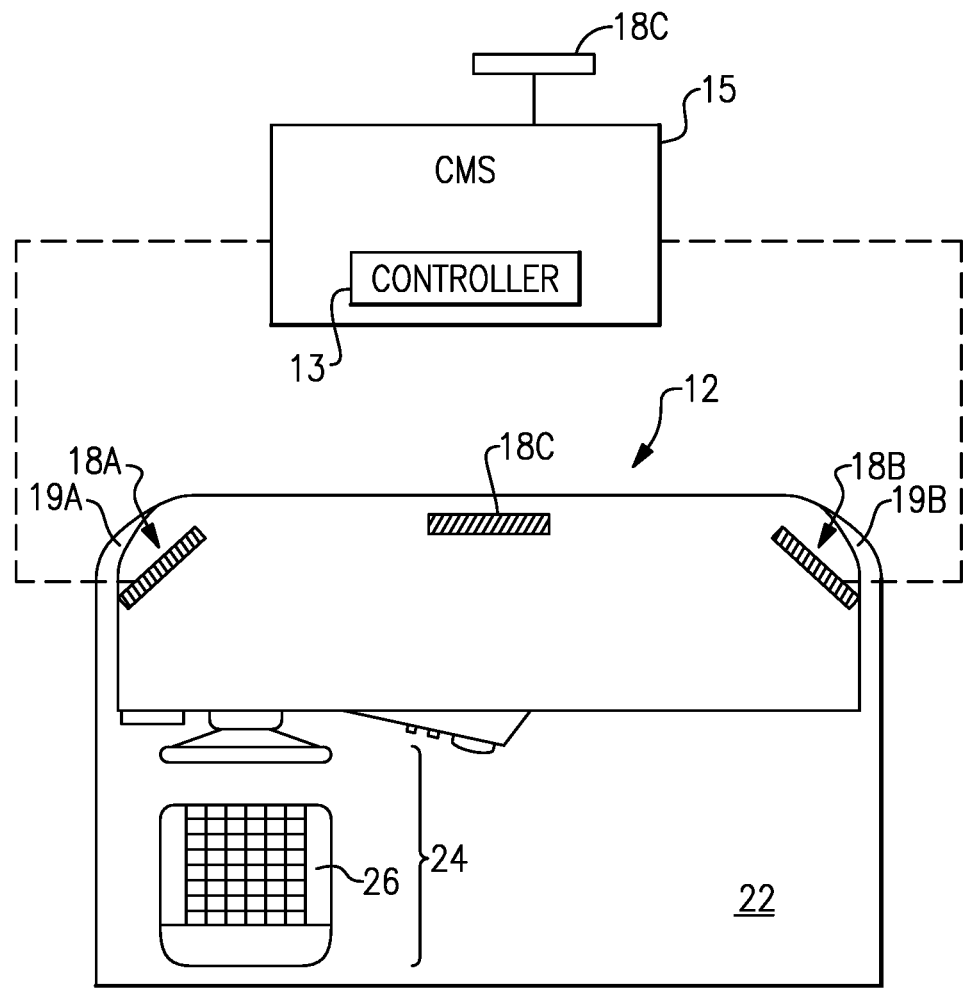
FIG. 2 is a schematic top perspective view of a vehicle cabin including displays and interior cameras.

Referring now to FIG. 2 with continued reference to FIGS. 1A-B, a camera mirror system (CMS) 15 includes driver and passenger side camera arms 16A, 16B mounted to the outside of the vehicle cab 12 (FIG. 1A). If desired, the camera arms 16A, 16B may include conventional mirrors integrated with them as well, although the CMS 15 may be used to entirely replace mirrors. In additional examples, each side can include multiple camera arms, each arm housing one or more cameras and/or mirrors. As shown in FIG. 2, the CMS 15 includes a CMS controller 13 that includes processing circuitry that supports operation of the CMS 15 and is operatively connected to memory (which may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The processing circuitry may include one or more microprocessors, microcontrollers, application specific integrated circuits (ASICs), or the like.

First and second electronic displays 18A-B, which may be video displays, are arranged on each of the driver and passenger sides within the vehicle cab 12 on or near the A-pillars 19A, 19B to display Class II and Class IV views on its respective side of the vehicle 10, which provide rear facing side views along the vehicle 10 that are captured by the exterior cameras 20A, 20B.

As discussed above, if video of Class V and Class VI views are also desired, the camera housing 16C and camera 20C may be arranged at or near the front of the vehicle 10 to provide those views (FIG. 1B). A third display 18C arranged within the cab 12 near the top center of the windshield can be used to display the Class V and Class VI views, which are toward the front of the vehicle 10, to the driver.

If video of Class VIII views is desired, camera housings can be disposed at the sides and rear of the vehicle 10 to provide fields of view including some or all of the Class VIII zones of the vehicle 10. In such examples, the third display 18c can include one or more frames displaying the Class Vill views. Alternatively, additional displays can be added near the first, second and third displays 18A, 18B, 18C and provide a display dedicated to providing a Class VIII view. The displays 18A, 18B, 18C face a driver region 34 within the cabin 32 where an operator is seated on a driver seat 36.

Figure 3A:
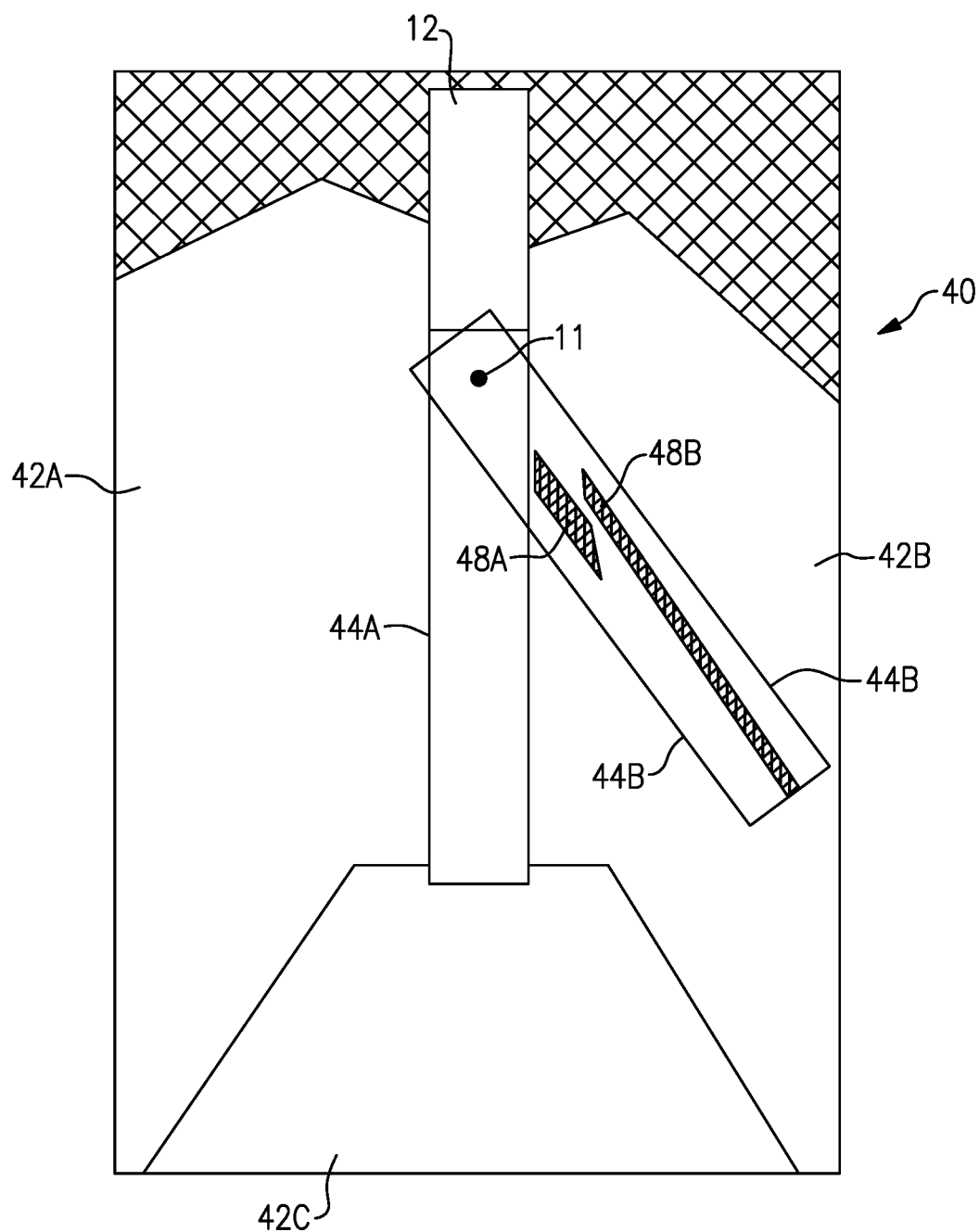
FIG. 3A schematically illustrates an example birds-eye view image of a commercial vehicle.

FIG. 3A schematically illustrates an example birds-eye view image 40 of the commercial vehicle 10 during a right turn which is based on image data from the cameras 20A, 20B, and 20D. The birds-eye view image 40 includes a first section 42A corresponding to image data from camera 20A, a second section 42B corresponding to image data from camera 20B, and a third section 42C corresponding to image data from camera 20D. The birds-eye view image 40 includes an expected trailer area 44A when the commercial vehicle 10 is expected to reside when the commercial vehicle 10 is not turning. In the image 40 though, the commercial vehicle is turning in a manner similar to what is depicted in FIG. 1C, where centerline/central longitudinal axis L1 of the tractor 12 pivots about the kingpin 11 and is angled with respect to the centerline/central longitudinal axis L2 of the trailer 14. As a result, a right side of the trailer is depicted in image area 44B.

In the image area 44B of the trailer 14, reflective US Department of Transportation ("DOT") tape sections 48A-B are shown. DOT tape includes alternating colors (red and white), and is typically placed horizontally along the lowest side of a trailer.

Figure 3B:
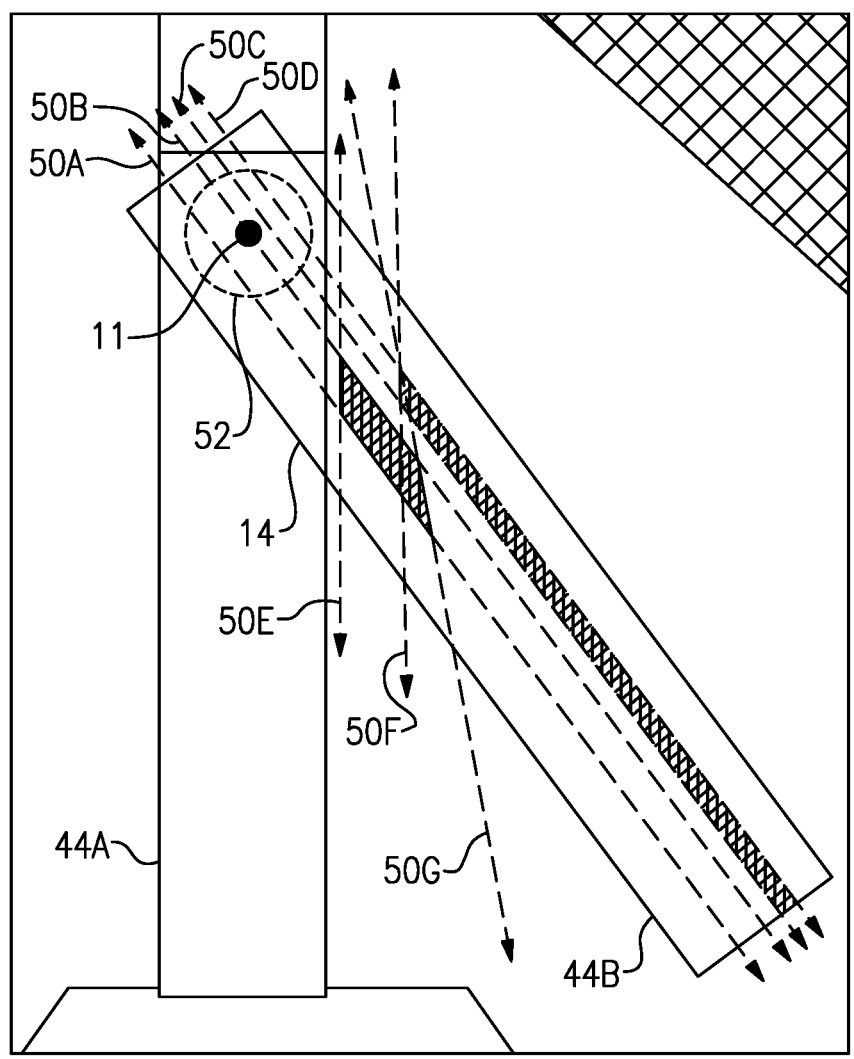
FIG. 3B is an enlargement of the birds-eye view image of FIG. 3A.

FIG. 3B schematically illustrates an enlarged portion of the birds-eye view image 40 of FIG. 3A. As shown, the trailer image area 44B includes a plurality of lines 50A-G that have been extended to see whether they extend through a pivot region 52 which includes and surrounds a pivot point (kingpin 11) between the tractor 12 and the trailer 14. Lines 50A-B (corresponding to edges of DOT tape section 48A) and lines 50C-D (corresponding to edges of DOT tape section 48B) all extend through the pivot region 52. Lines 50E-G, corresponding to different edges of the DOT tape, do not extend through the pivot region. In addition to reflective DOT tape, so-called "rub rails" that run along a portion of a length of the trailer and protect the trailer 14 from rubbing against external objects, or other items on the side of a trailer may provide useful lines that intersect the pivot region 52. It is understood that the use of DOT tape is a non-limiting example of a line that may be provided on a trailer and may extend through the pivot region 52, and that other lines that do not correspond to DOT tape and that extend through the pivot region 52 may be used as the basis for determining a trailer angle.

Although FIGS. 3A-B each include a trailer area 44A, in one or more embodiments, the birds-eye view image may narrow or omit this area, e.g., such that the pivot region is a line segment extending along the axis L2.

In one or more embodiments (e.g., as shown in FIG. 3B), the pivot region 52 is within a perimeter of the trailer in the birds-eye view image 40. In one or more embodiments, the pivot region 52 has an area that is less than 20% of an area of the trailer in the birds-eye view image.

Figure 4:
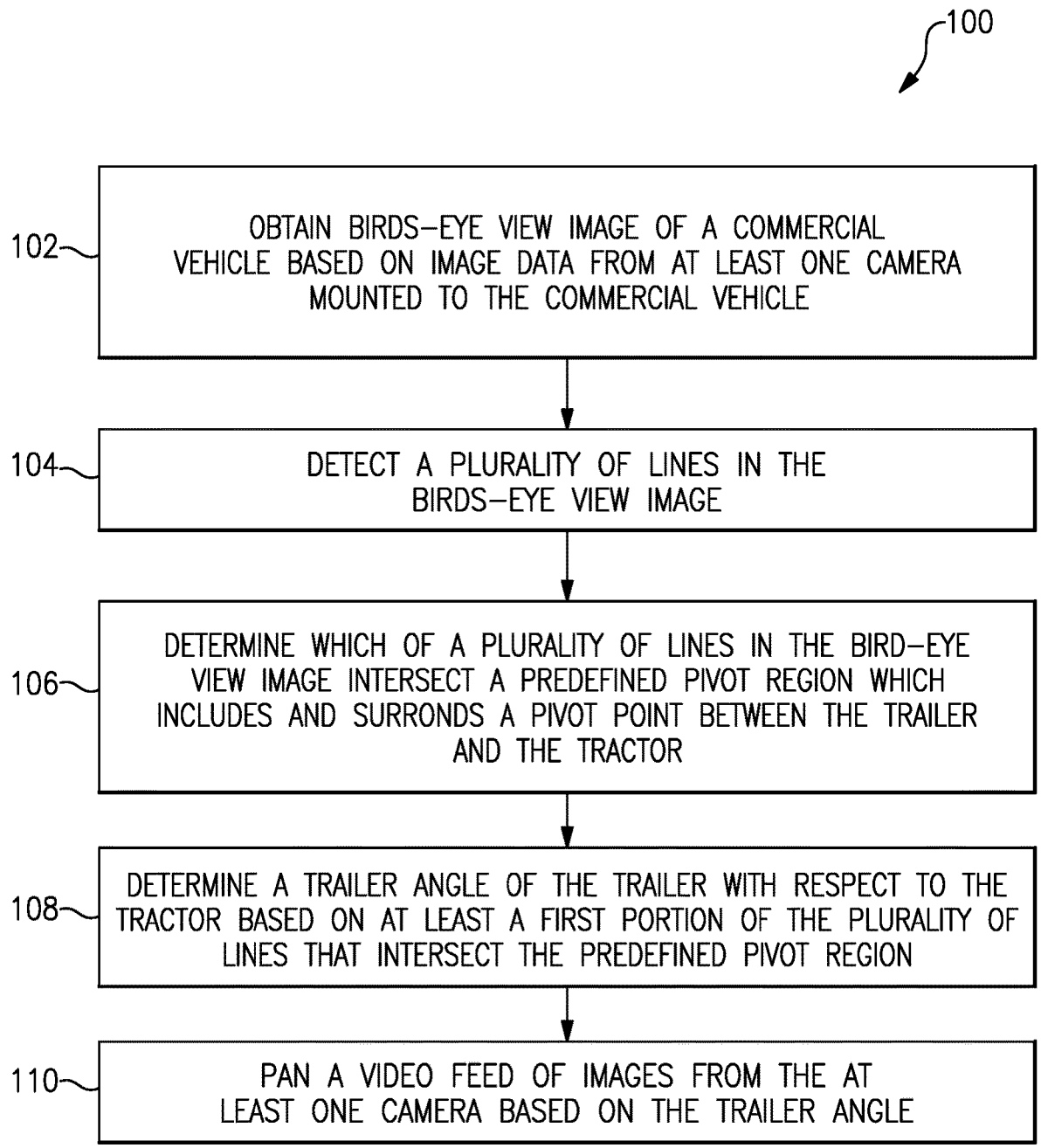
FIG. 4 is a flowchart of an example method of determining a trailer angle.

FIG. 4 is a flowchart of an example method 100 of determining a trailer angle. Referring now to FIG. 4, with continued reference to FIGS. 3A-B, a birds-eye view image 40 of a trailer of commercial vehicle 10 is obtained (step 102) based on image data from at least one camera 20 mounted to the commercial vehicle 10 that depicts at least one side of the trailer 14 (e.g., based on image data corresponding to sections 42A-B or 42A-C). A plurality of lines in the birds-eye view image are detected (step 104) using conventional image processing techniques.

A determination is made of which of the plurality of lines 50A-G in the birds-eye view image 40 intersect the predefined pivot region 52 (step 106). In the present example, the lines 50A-G include a first portion of the lines (50A-D) that intersect the pivot region 52, and a second portion of the lines (50E-G) that do not intersect the pivot region 52.

A determination is made of a trailer angle of the trailer 14 with respect to the tractor 12 based on at least the first portion of the plurality of lines that intersect the predefined pivot region (i.e., lines 50A-D) (step 108), and a video feed of images from the at least one camera of step 102 is panned based on the camera angle (step 110) (e.g., to keep an area surrounding one or more sides of the trailer 14 in view for a vehicle occupant on the displays 18A and/or 18B).

The determining of step 108 includes excluding the second portion of the plurality of lines (50E-G) that do not intersect the predefined pivot region from the determination of the trailer angle, or weighting the first portion of the plurality of lines greater than the second portion of the plurality of lines in the determination of the trailer angle. Either option serves as a sort of filtering, whereby lines outside of the pivot region are de-emphasized.

Figure 5:
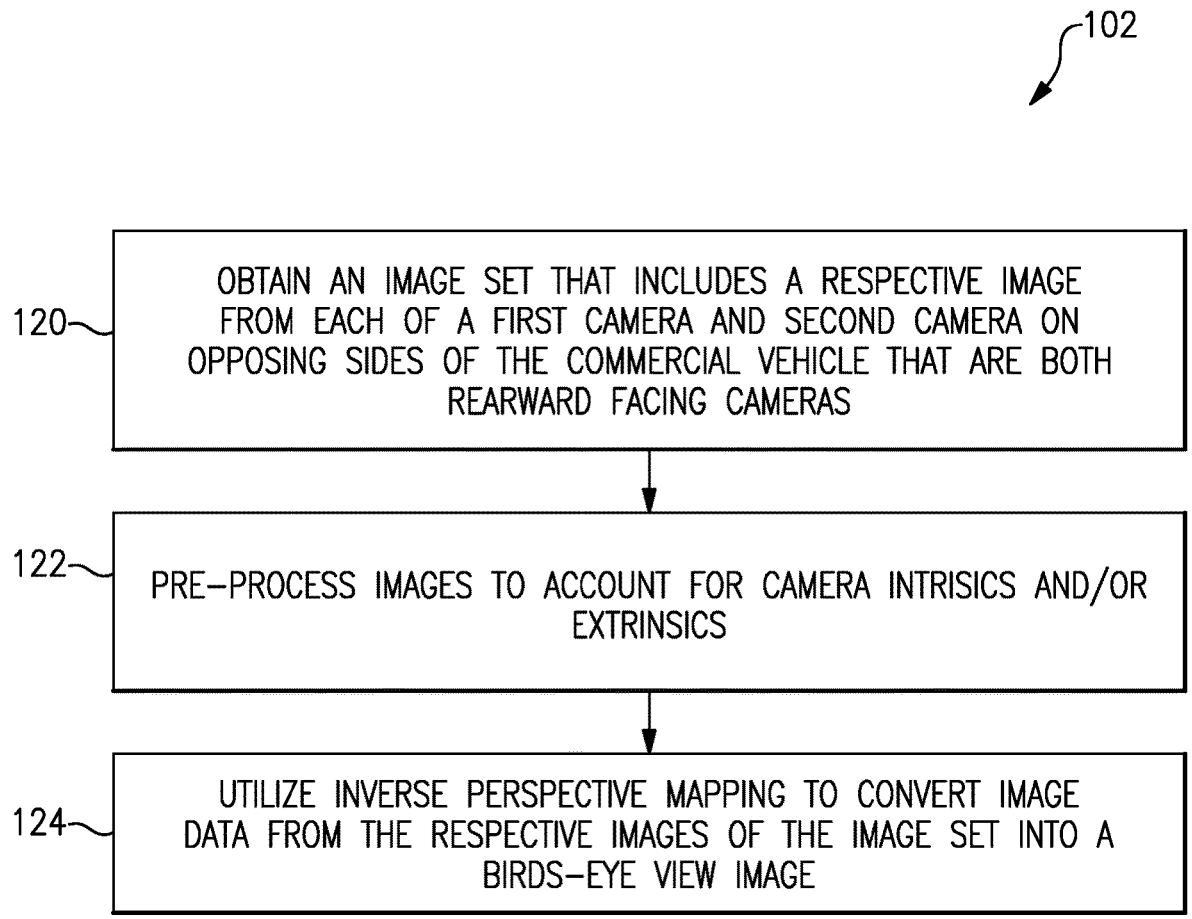
FIG. 5 is a flowchart of an example implementation of a step of the flowchart of FIG. 4.

FIG. 5 is a flowchart of an example implementation of a step of the flowchart of FIG. 4. An image set is obtained (step 120) that includes a respective non-birds-eye view image from each of a first camera (e.g., camera 20A) and a second camera (e.g., camera 20B) on opposing sides of the commercial vehicle 10 that are both rearward-facing cameras. As used herein, "rearward-facing" means a camera oriented towards a rear of a vehicle.

The images are pre-processed (step 122) to account for camera intrinsics (e.g., device-specific distortions, including positioning of camera lens relative to video sensor) and/or camera extrinsics (i.e., camera physical positioning on the vehicle, aligned to a common real-world coordinate system, which will have some variation from vehicle to vehicle). In one or more embodiments, this includes adjusting a first image in the image set from the first camera to account for distortion of the first camera, and adjusting a second image in the image set from the second camera to account for distortion of the second camera, and the birds-eye view image of step 102 is obtained from the adjusted first image and/or the adjusted second image.

"Inverse perspective mapping" is utilized to convert image data from the respective images of the image set into a birds-eye view image (step 124). The OpenCV "warpPerspective" function may be utilized as part of this conversion. The "warpPerspective" function selects four reference points on a camera image and gives their pixel coordinates and the respective world coordinates in the tractor's coordinate system as its input parameters for a perspective mapping transformation.

The inverse perspective mapping of step 124 converts the non-birds-eye views from the images in the image set of step 120 and maps them onto a birds-eye view of the commercial vehicle 10.

Referring again to FIG. 4, step 106 (determining which of the plurality of lines in the birds-eye view image intersect the pivot region) may involve one or more methods, such as Hough transformations, ellipse filters/detectors, ransack and/or other CV (computer vision) methods used to detect linear and near-linear features. These same techniques may be used to determine borders of the trailer 14 in the images from the camera(s) 20.

The pivot point where the trailer 14 attaches to the tractor 12 (i.e., the "kingpin") remains at the same coordinates in a correctly transformed birds-eye view image, irrespective of trailer angle, and therefore provides a useful anchor reference point for determining which lines within the birds-eye view image correspond to the trailer angle, while filtering out other lines and other image data that may otherwise confound conventional trailer angle detection techniques.

As discussed above, the determining of step 108 includes excluding the second portion of the plurality of lines (50E-G) that do not intersect the predefined pivot region from the determination of the trailer angle, or weighting the first portion of the plurality of lines greater than the second portion of the plurality of lines in the determination of the trailer angle. In either option, "radial filtering" is used.

In the "weighting" option, the "radial filtering" results in straight line features that intersect with the pivot region of the image being given a greater prominence/weight than those that do not intersect with the pivot region. The radial filtering approach to selecting the most relevant lines within the transformed image may enable a high degree of computational efficiency relative to other line detection and filtration techniques.

In one or more embodiments, the method 100 includes determining a plurality of angles between a centerline of the tractor 12 (e.g., axis L1) and each of the lines 50A-D that intersect the pivot region, and determining the trailer angle based on the plurality of angles (e.g., an average of the plurality of angles).

In one or more embodiments, the method 100 includes repeating steps 102, 104, 106, and 108 to determine a plurality of trailer angles, determining an aggregate trailer angle based on the plurality of trailer angles, and providing a notification and/or the panning of step 110 based on the aggregate trailer angle. The aggregate may be an average or a weighted average (e.g., of the most favorably-weighted lines).

In one or more embodiments, the method includes repeating steps 102, 104, 106, and 108 for a plurality of image sets to determine a sequence of a plurality of trailer angles, determining a confidence score for each of the plurality of trailer angles, and adjusting a frequency at which the method 100 is repeated based on the confidence score. Thus, times-series filter (e.g., a Kalman filter) calculations, or other calculations, may be used to combine a series of trailer angle estimates over time in order to reduce noise, improve accuracy and usability in the overall camera-mirror system implementation.

Such calibration calculations (which may be continuous) may involve comparing trailer angle estimates derived from the method 100 to trailer angles derived from other known techniques (e.g., kinematic model estimates of trailer angle) in order to improve overall accuracy and reliability. The calibration calculation may involve introducing a correction value to the birds-eye view derived estimate of trailer angle such that the corrected value yields a "zero" angle at times when the tractor-trailer combination is moving forward at high speed (i.e., >80 kph).

The method 100 provides a novel and innovative approach to determining trailer angle based on "birds-eye" mapping (which facilitates incorporation of information from multiple cameras into the algorithm's logic). The radial filtering feature extraction technique discussed above (e.g., whereby lines outside of the pivot region are de-emphasized), yields a breakthrough level of performance in range of angle and conditions in which the trailer angle can be calculated accurately and in a computationally efficient manner.

Although example embodiments have been disclosed, a worker of ordinary skill in this art would recognize that certain modifications would come within the scope of the claims. For that reason, the following claims should be studied to determine their true scope and content.

What is claimed is:

1. A method of determining a trailer angle, comprising:
    obtaining a birds-eye view image of a commercial vehicle based on image data from at least one camera mounted to the commercial vehicle that depicts at least one side of a trailer, the commercial vehicle including a tractor and the trailer;
    determining which of a plurality of lines in the birds-eye view image intersect a predefined pivot region which includes and surrounds a pivot point between the trailer and the tractor;
    determining a trailer angle of the trailer with respect to the tractor based on at least a first portion of the plurality of lines that intersect the predefined pivot region; and
    panning a video feed of images from the at least one camera based on the trailer angle;
    wherein said determining the trailer angle comprises:
        excluding a second portion of the plurality of lines that do not intersect the predefined pivot region from the determination of the trailer angle; or
        weighting the first portion of the plurality of lines greater than the second portion of the plurality of lines in the determination of the trailer angle.

2. The method of claim 1, wherein determining the trailer angle comprises performing said excluding the second portion of the plurality of lines that do not intersect the predefined pivot region from the determination of the trailer angle.

3. The method of claim 1, wherein determining the trailer angle comprises performing said weighting the first portion of the plurality of lines greater than the second portion of the plurality of lines in the determination of the trailer angle.

4. The method of claim 1, wherein:
    the at least one camera includes a first camera and a second camera on opposing sides of the commercial vehicle that are both rearward-facing cameras; and
    said obtaining the birds-eye view image of the commercial vehicle based on the image data from the least one camera comprises:
        obtaining an image set that includes a respective image from each of the first camera and second camera; and
        utilizing inverse perspective mapping to convert image data from the respective images of the image set into the birds-eye view image.

5. The method of claim 4, comprising:
    adjusting a first image in the image set from the first camera to account for distortion of the first camera; and
    adjusting a second image in the image set from the second camera to account for distortion of the second camera;
    wherein the birds-eye view image is obtained from the adjusted first image and the adjusted second image.

6. The method of claim 1, wherein said determining the trailer angle of the trailer comprises:
    determining a plurality of angles between a centerline of the tractor and each of said at least the first portion of the plurality of lines; and
    determining the trailer angle based on the plurality of angles.

7. The method of claim 1, wherein the pivot region is within a perimeter of the trailer in the birds-eye view image.

8. The method of claim 1, wherein the pivot region has an area that is less than 20% of an area of the trailer in the birds-eye view image.

9. The method of claim 1, comprising:
    repeating said obtaining step and determining steps for a plurality of the image sets, to determine a sequence of a plurality of trailer angles;
    determining a confidence score for each of the plurality of trailer angles; and
    adjusting a frequency at which said utilizing step, obtaining step, and determining steps are performed based on the confidence score.

10. The method of claim 1, comprising:
    Repeating said obtaining step and determining steps for a plurality of image sets, to determine a plurality of trailer angles;
    determining an aggregate trailer angle based on the plurality of trailer angles; and
    performing the panning based on the aggregate trailer angle.

11. A system for a commercial vehicle, comprising:
    at least one camera mounted to a commercial vehicle, the commercial vehicle including a tractor and a trailer; and
    processing circuitry operatively connected to memory and configured to:
        obtain a birds-eye view image of the commercial vehicle based on image data from the at least one camera;
        determine which of a plurality of lines in the birds-eye view image intersect a predefined pivot region which includes and surrounds a pivot point between the trailer and the tractor;
        determine a trailer angle of the trailer with respect to the tractor based on at least a first portion of the plurality of lines that intersect the predefined pivot region; and
        pan a video feed of images from the at least one camera based on the trailer angle;
    wherein to determine the trailer angle, the processing circuitry is configured to:
        exclude a second portion of the plurality of lines that do not intersect the predefined pivot region from the determination of the trailer angle; or
        weight the first portion of the plurality of lines greater than the second portion of the plurality of lines in the determination of the trailer angle.

12. The system of claim 11, wherein to determine the trailer angle, the processing circuitry is configured to exclude the second portion of the plurality of lines that do not intersect the predefined pivot region from the determination of the trailer angle.

13. The system of claim 11, wherein to determine the trailer angle, the processing circuitry is configured to weight of the first portion of the plurality of lines greater than the second portion of the plurality of lines in the determination of the trailer angle.

14. The system of claim 11, wherein:
    the at least one camera includes a first camera and a second camera on opposing sides of the commercial vehicle that are both rearward-facing cameras; and
    to obtain the birds-eye view image of the commercial vehicle based on image data from the least one camera, the processing circuitry is configured to:
        obtain an image set that includes a respective image from each of the first camera and second camera; and
        utilize inverse perspective mapping to convert image data from the respective images of the image set into a birds-eye view image.

15. The system of claim 14, wherein the processing circuitry is configured to:
  adjust a first image in the image set from the first camera to account for distortion of the first camera; and
  adjust a second image in the image set from the second camera to account for distortion of the second camera;
  wherein the birds-eye view image is obtained from the adjusted first image and adjusted second image.

16. The system of claim 11, wherein said to determine the trailer angle of the trailer with respect to the tractor based on at least a first portion of the plurality of lines that intersect the predefined pivot region, the processing circuitry is configured to:
  determine a plurality of angles between a centerline of the tractor and each of said at least the first portion of the plurality of lines;
  determine the trailer angle based on the plurality of angles.

17. The system of claim 11, wherein the pivot region is within a perimeter of the trailer in the birds-eye view image.

18. The system of claim 11, wherein the pivot region has an area that is less than 20% of an area of the trailer in the birds-eye view image.

19. The system of claim 11, wherein the processing circuitry is configured to:
  determine a plurality of the trailer angles;
  determine a confidence score for each of the plurality of trailer angles; and
  adjust a frequency at which the trailer angles are determined based on the confidence score.

20. The system of claim 11, comprising:
  determine a plurality of the trailer angles;
  determine an aggregate trailer angle based on the plurality of trailer angles; and
  perform the panning based on the aggregate trailer angle.

* * * * *